Nov. 23, 1954

G. M. ERNST 2,695,059

METAL SHEARS

Filed June 6, 1951

INVENTOR.
GEORGE M. ERNST
BY
ATTORNEY

Nov. 23, 1954 G. M. ERNST 2,695,059
METAL SHEARS
Filed June 6, 1951
2 Sheets-Sheet 2

INVENTOR.
GEORGE M. ERNST
BY
ATTORNEY 2,695,059

METAL SHEARS

George M. Ernst, Compton, Calif.

Application June 6, 1951, Serial No. 230,178

1 Claim. (Cl. 164—40)

This invention relates to a metal shearing device for cutting off structural bars of conventional cross-section, such as angle bars, channel bars, round bars, square bars, etc., and has for its principal object the provision of a light-weight, portable shearing device which can be easily and quickly operated by hand to cut bars of any desired cross-section without bending or distorting the bar, and with a clean, smooth, even cut.

A further object of the invention is to construct the device so that it can be operated either by hand or power or from a source of fluid pressure, and so that it can be easily carried to the work, eliminating the necessity of transporting the bar to a stationary power machine.

Other objects and advantages reside in the detail construction of the invention, which is designed for simplicity, economy, and efficiency. These will become more apparent from the following description.

In the following detailed description, of the invention, reference is had to the accompanying drawing which forms a part hereof. Like numerals refer to like parts in all views of the drawing and throughout the description.

Figure 1:
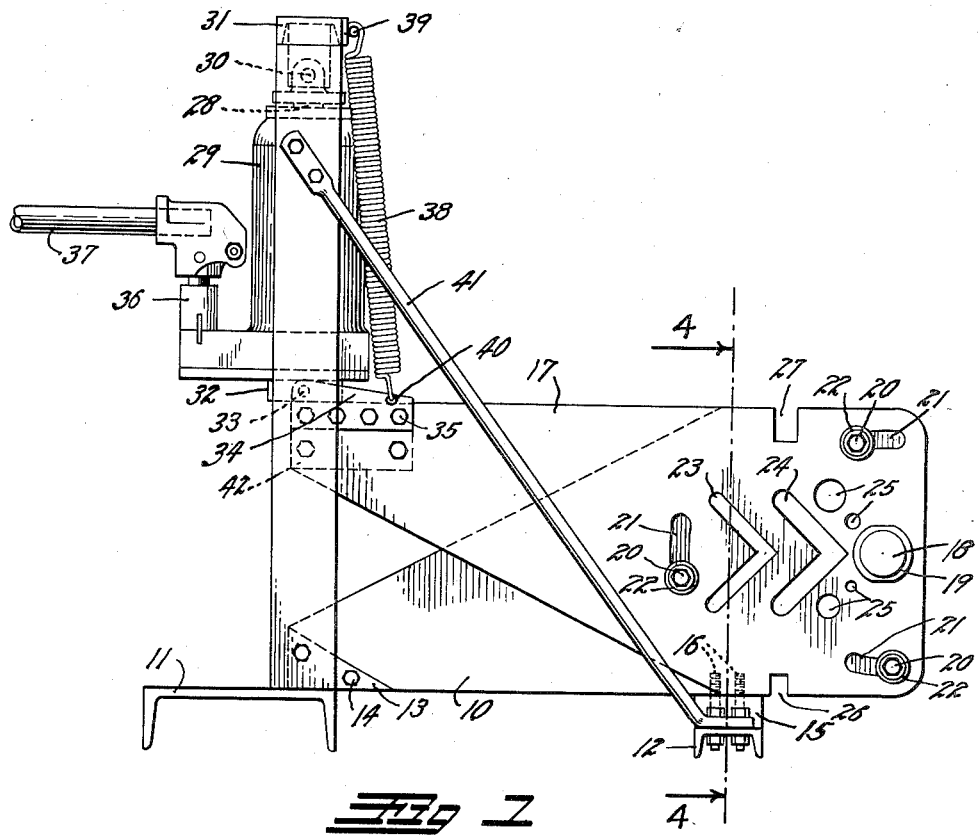
Fig. 1 is a plan view of the improved bar stock shearing device.

The improved shearing device employs a relatively thick, stationary lower blade plate 10 which is supported in a rigid, vertical position by means of a forward channel iron base member 11 and a rear channel iron base member 12. The blade plate 10 is secured by means of suitable attachment screws 14 to the forward base member 11 by means of an angle bracket member 13 which is welded or otherwise secured to the base plate 11. The rear base member 12 is attached to the blade plate 10 through the medium of a spacing block 15 and suitable cap screws 16 which are threaded into the lower blade plate 10.

A movable blade plate 17, similar in thickness to the upper blade plate, is positioned tightly against, and in frictional engagement with, the fixed plate 10. The two plates are pivoted together on a relatively heavy hinge pin 18 extending through both plates and provided with suitable retaining nuts 19. The two plates may be drawn together into relatively tight, frictional engagement by means of cap screws 20 which are threaded into the stationary plate 10 and extend through arcuately slotted openings 21 in the movable plate 17. The screws 20 are provided with clamping washers 22 which frictionally engage the outer surface of the plate 17.

The two blade plates 10 and 17 are provided with registering, material-receiving openings of any desired size and shape, through which bars of similar size and shape may be passed through both plates.

Figure 2:
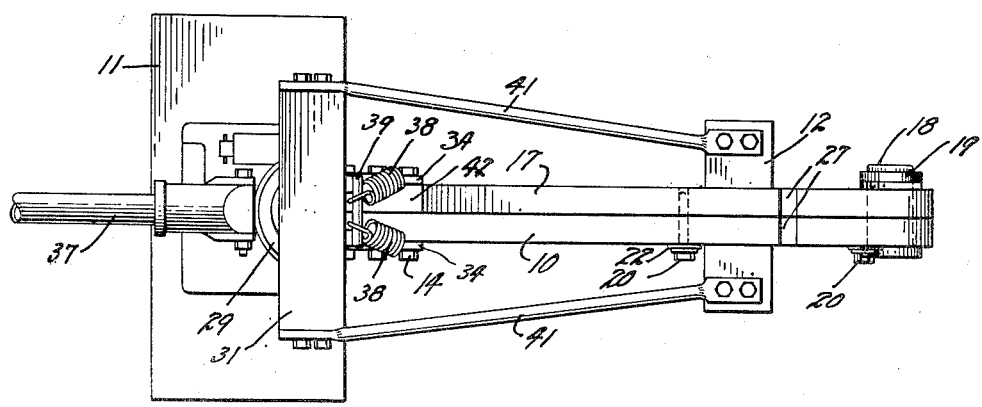
Fig. 2 is a side view thereof.
Figure 3:
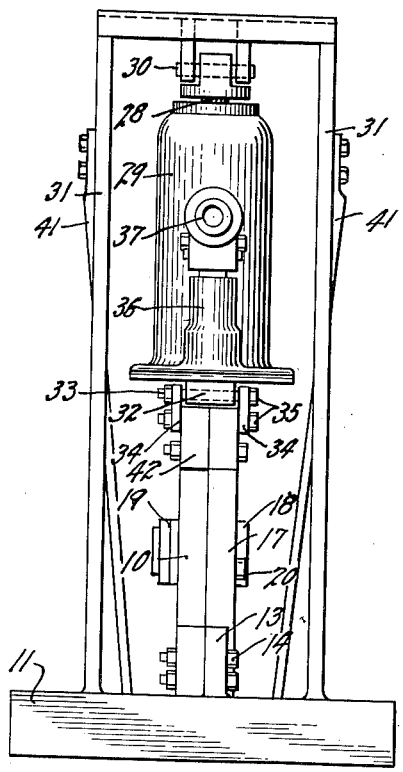
Fig. 3 is a front view.
Figure 4:
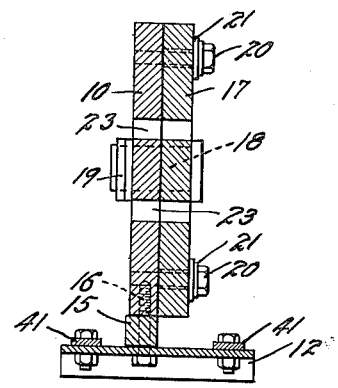
Fig. 4 is a vertical cross-section, taken on the line 4—4, Fig. 2.

As illustrated, the two plates are provided with a small, L-shaped angle bar opening 23, a relatively larger L-shaped angle bar opening 24, round openings 25 of various sizes, and with a lower edge notch 26 and an upper edge notch 27. The openings and notches in the two plates align with each other when the movable plate 17 is in the elevated position of Fig. 2. It can be readily seen that if a bar is extended through aligned openings or notches corresponding in shape and size to the bar, and if the movable blade plate 17 be forced downwardly alongside the fixed blade plate 10, the inserted bar will be sheared off on a plane corresponding to the contact plane between the two plates.

In the device illustrated, the downward movement of the plate 17 is accomplished through the medium of a hydraulic plunger 28 extending upwardly from a hydraulic jack cylinder 29. The hydraulic plunger 28 is suspended from a hanger bolt 30 mounted in the top of an inverted, U-shaped, vertical frame 31. The lower extremities of the U-shaped frame 31 are welded or otherwise secured on the base member 11 and extend vertically upward therefrom on each side of the forward extremities of the blade plates 10 and 17. The vertical frame 31 is rigidly supported in its vertical position by means of inclined brace rods 41 which extend rearwardly from the top of the frame to an attachment to the rear base member 12.

The hydraulic jack cylinder is provided with a downwardly extending ear 32 through which a hinge pin 33 is passed. The hinge pin extends through two spaced-apart bracket plates 34 which are removably attached to the upper blade plate 17 by means of suitable cap screws 35.

Fluid pressure may be supplied to the hydraulic cylinder 29 from any outside source of pressure, either pneumatic or hydraulic. As illustrated, the pressure is supplied through the medium of a hydraulic pump 36, similar to that used on hydraulic jacks, actuated through the medium of a reciprocating jack handle 37.

The upper blade plate 17 is yieldably supported by means of two tension springs 38 extending from a suspension rod 39, mounted at the top of the frame 31, to spring-receiving openings 40 formed in the two bracket plates 34.

The operation of the improved shear is believed to be apparent. Briefly, the bar to be sheared is inserted in the proper opening in the aligned plates. The jack handle 37 is then reciprocated to force fluid into the cylinder 29 to cause the latter to move downwardly so as to force the forward extremity of the upper plate 17 downwardly on an arc about the axis of the hinge pin 18.

Figure 5:
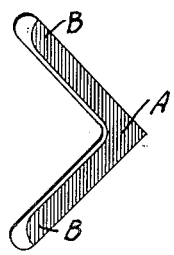
Figs. 5, 6 and 7 are diagrammatic views, illustrating the shearing action of the device while cutting a conventional angle iron.
Figure 6:
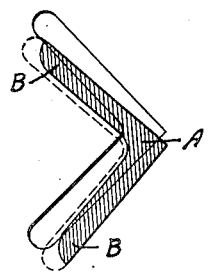
Figure 7:
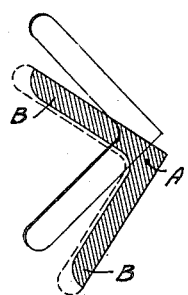

Let us assume that an angle iron has been positioned in the aligned openings 25. Due to the leverage action about the axis of the hinge pin, the two outer legs of the angle iron will be sheared first and at a more rapid rate than the joining or apex edges of the angle iron, as indicated in Fig. 5. The shearing action will advance progressively toward the apex edges, and the metal at the joining or apex portion of the angle iron will be shifted laterally with an internal shearing action which separates the bar completely when the position shown in Fig. 6 has been reached.

It will be noted that the greatest pressure is required at the joining portion, indicated at "A," than at the terminal portions, indicated at "B." This is accommodated, however, due to the fact that the portion "A" is on a shorter lever arm from the axis of the pin 18 than the terminal portions "B."

The shearing of round or square bars in the openings 25, 26, and 27 is a simple and direct sideward shearing action, and since the bars fit their respective openings snugly, all distortion at the shearing points is avoided.

It is desired to call attention to the angle cut on the lower forward portion of the upper plate 17 and on the lower forward portion of the upper plate 17 and on the upper forward portion of the lower plate 10. These angle cuts allow the forward extremity of the upper plate to move downwardly a relatively great distance without contacting the base members and without increasing the height of the entire shear. It will also be noted that the two plates 10 and 17 are exactly similar so that, should the edges of the openings therein become worn at the adjacent faces, the plates may be reversed to place their respective outer faces together to create new cutting edges at the openings. They can also be reversed as to position, that is, the upper plate may become the lower plate, and the lower plate may be attached to the hydraulic cylinder so as to alternate the cutting edges in the openings. This allows substantially four renewals of the cutting edges of the blades without sharpening.

The sharpening operation, however, is comparatively simple, since the plates may be quickly and easily ground off with a surface grinder to reduce their thickness by a few thousandths of an inch to provide entirely new cutting edges on all openings and notches. The reduced thickness can be easily taken up by tightening the clamping cap screws 20.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A construction for shears of the type adapted for shearing structural steel shapes comprising: a first elongated blade plate of uniform thickness having a vertical rear extremity and a horizontal bottom edge, the upper edge of said plate inclining downwardly and forwardly to a relatively low front extremity; a forward channel iron secured at its middle to said plate below said low front extremity and extending transversally of said plate and acting to maintain the width of said first plate rigidly vertical; a second elongated blade plate of uniform thickness, said second plate being similar in shape to said first plate and positioned in inverted relation to and against said first plate so that the lower edge of said second plate inclines forwardly and upwardly across the downwardly and forwardly extending upper edge of said first plate; a hinge pin hingedly securing said plates together adjacent their vertical rear extremities, said plates having registering shearing openings adjacent said hinge pin; a hydraulic cylinder mounted on the forward extremity of said second plate; a hydraulic plunger actuated by fluid in said cylinder and extending upwardly therefrom; an inverted, U-shaped frame fixedly mounted on said base member and extending upwardly therefrom and over said plunger; a hanger device suspending said plunger from said U-shaped frame; a spring suspending said second plate from said U-shaped frame; means for supplying fluid under pressure to said cylinder to cause the forward extremity of said second plate to descend toward the forward extremity of said first plate; a second channel iron positioned beneath and extending transversally of said plates adjacent the rear extremities thereof; means securing the mid-portion of said second channel iron to said first plate in spaced relation to the latter to allow the lower edge of the second plate to move downwardly below the lower edge of the first plate; and a brace rod extending from adjacent each extremity of said second channel iron forwardly and upwardly to said U-shaped frame to maintain the latter in a vertical position.

References Cited in the file of this patent

UNITED STATES PATENTS

| Number | Name | Date |
|---|---|---|
| 542,190 | Guild | July 2, 1895 |
| 812,452 | Richards | Feb. 13, 1906 |
| 1,318,249 | Winters | Oct. 7, 1919 |
| 2,291,204 | Betterton et al. | July 28, 1942 |
| 2,421,414 | Ernst | June 3, 1947 |
| 2,603,255 | Woolery | July 15, 1952 |